United States Patent [19]

Yuan

[11] 4,040,578
[45] * Aug. 9, 1977

[54] ROTOR VORTEX CONTROL

[76] Inventor: Shao Wen Yuan, 6701 Montour Drive, Falls Church, Va. 22043

[*] Notice: The portion of the term of this patent subsequent to Feb. 3, 1993, has been disclaimed.

[21] Appl. No.: 654,695

[22] Filed: Feb. 2, 1976

Related U.S. Application Data

[63] Continuation-in-part of Ser. No. 425,143, Dec. 17, 1973, Pat. No. 3,936,013.

[51] Int. Cl.² .................................. B64C 23/06
[52] U.S. Cl. .................................. 244/17.19; 244/199; 416/20 R; 416/90 A
[58] Field of Search ............... 244/40 R, 40 A, 130, 244/17.19; 416/20, 90 A

[56] References Cited

U.S. PATENT DOCUMENTS

| | | | |
|---|---|---|---|
| 2,925,129 | 2/1960 | Yuan et al. | 416/90 A |
| 3,446,288 | 5/1969 | Yuan | 416/90 A |
| 3,936,013 | 2/1976 | Yuan | 244/40 A |

Primary Examiner—Trygve M. Blix
Assistant Examiner—Barry L. Kelmachter

[57] ABSTRACT

This invention is for rotating machines of all types such as helicopters, propellers, compressors, to be equipped with slotted tube or a tube with series of holes extending outwardly in the spanwise direction near the trailing edge of a jet-circulation-control rotor-blade tip for blowing jets of fluid in the direction opposite to the lift of the blade. Thereby achieving flow in the form of a jet sheet to abate, diffuse the undesirable blade-tip vortices and to increase the overall efficiency of the machine.

5 Claims, 10 Drawing Figures

ROTOR VORTEX CONTROL

SUMMARY OF INVENTION

This is a continuation-in-part of my pending application Ser. No. 425,143, filed Dec. 17, 1973 to be issued as U.S. Pat. No. 3,936,013.

This invention relates to vortex control devices for lifting surface of rotating machines (helicopters, autogiros, gyrodynes, convertible crafts, compressors, turbines, blowers, propellers, and the like) to which wings or blades are attached (to the rotor) for sustaining, propelling and controlling the machines. I define "blade" (lifting surface) as a structural member of a vehicle or machine which moves relatively in a fluid, hence a force, lift or thrust, is generated in the direction perpendicular to the fluid motion. By way of illustration, this invention will, however, be shown and described mostly as incorporated in a helicopter with suitably attached blades as to which the invention has distinct advantages.

It is well known that every heavier-than-air craft generates wake turbulence in the form of vortices trailing behind the lifting surface of the craft whenever its wings or blades are generating lift. The strength of the vortices depends directly on the weight of the craft that generates them, and the speed at which it is flying.

For rotary-wing aircraft, in addition to the above-mentioned disturbance which has caused hazard to the following crafts, the pursuing blade which passes over the vortices generated by the preceding blade undergoes a severe impulsive loading. This is one of the major sources of helicopter rotor noise which is often referred to a blade slap. In addition to the above-mentioned adverse aspects of blade-tip vortices, it also causes severe rotor vibrations, an increase in rotor drag and a reduction of lift due to blade tip loss.

The prior invention (Yuan, U.S. Pat. No. 3,692,259) dealing with this problem consists of a round blade-tip provided with at least one slot in a conduit extending along the chordwise direction of the blade tip for blowing jets of air at pre-selected locations along well chosen directions, thereby achieving circulation to counterbalance the undersirable blade-tip vortices.

The present invention provides new and improved means for blowing jets to counterbalance and diffuse the undesirable blade-tip vortices regardless of the shape and thickness of the blade tip.

For accomplishing the foregoing object, the invention contemplates the use of a blade tip which is provided with a slotted tube, or a tube with series of holes extending outwardly in the spanwise direction near the trailing edge of the blade tip for blowing jets of air along well chosen directions, (this tube will be called vortex jet tube) thereby achieving flow in the form of a jet sheet to counterbalance and diffuse the undesirable blade-tip vortices.

Accordingly, an important object of the invention is to diminish or abate the above-described blade-tip vortices created by moving blades in fluids.

Another object is to provide helicopter or other rotary machines with novel jet means to abate rotor vibrations and hence to increase the rotor efficiency.

A further object is to provide for a rotor-blade tips blowing jets having control means for changing the magnitude of the jet momentum and thereby abating the blade tip loss and increasing the rotor lift and reducing the drag.

A still further object is to provide a means for cyclically altering the tip jet momentum of rotor blades during the forward flight of a helicopter for counterbalancing the cyclically varying blade-tip vortices produced by the rotor blades.

Still another object is to provide the above-mentioned rotor-blade system with a novel cross-section of round leading and trailing edges and including suitably mounted, at least one, jet-producing means on/or adjacent the edge of the blade for blowing jets of fluid into the free stream, said jets having means for controllably adjusting the jet means to materially increase the lift and thrust of the rotor blade to extremely high degrees of efficiency.

It is to be understood that both the foregoing general description and the following detailed description are exemplary and explanatory but are not restrictive of the invention.

REFERENCE TO DRAWINGS

The preferred forms of the invention are illustrated in the accompanying drawings, in which.

Figure 1:
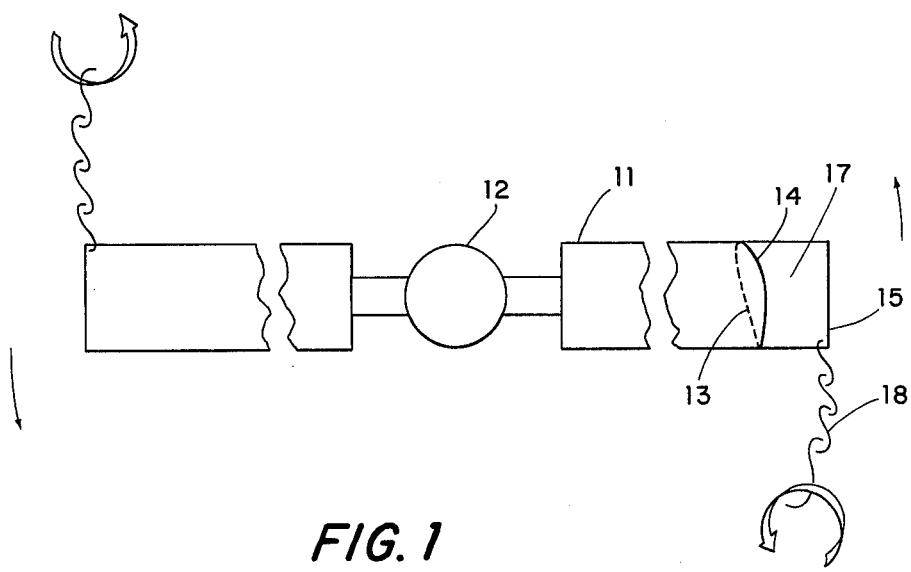
FIG. 1 is a top plan view of a rotor blade system without the main body portion and including symbols illustrating blade-tip vortices.

Referring to FIG. 1, there is shown a rotor-blade 11 which is attached to a rotor hub 12. When the rotor revolves, lift is generated by the blades which sustains the weight of the craft. The production of lift by the blades is the result of a strong positive pressure of the lower surfaces 13 of the blade and a suction or negative pressure on the upper surface 14 of the blade. Consequently, there is a difference in pressure between the two surfaces of the blade which results in a flow of air around the ends of the blade 15, from the region of higher pressure to the region of lower pressure. Through the motion of the air from the inner portion of the span 17 toward the tip 15 on the lower surface of the blade, and from the tip 15 toward the inner portion on the upper surface 14 of the blade, there are set up blade-tip vortices 18 aligned with the main stream of incoming flow. As the craft moves forward the blade-tip vortices trail behind and remain in the air for an extended length of time.

Figure 2:
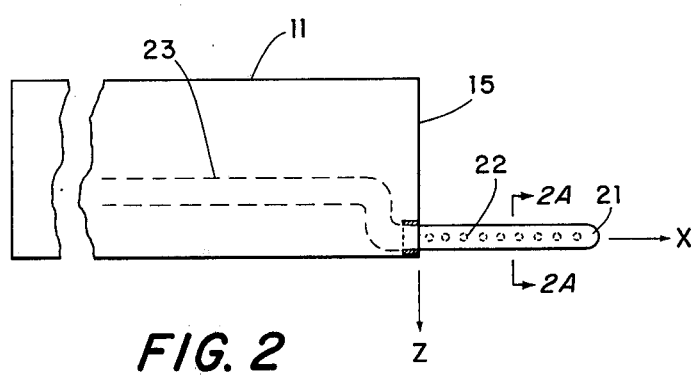
FIG. 2 is a plan view (X-Z plane) of a rotor-blade tip arrangement with an extended tube for a blowing jet employing this invention.
Figure 2A:
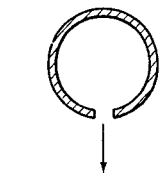
FIG. 2A is an enlarged side sectional view taken on line 2A—2A of FIG. 2.
Figure 3:
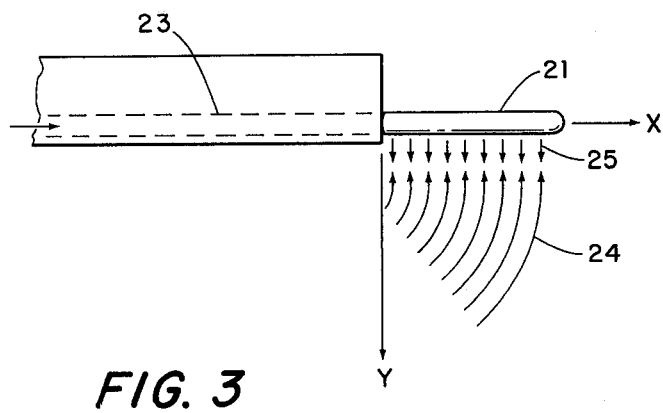
FIG. 3 is a rear view (X-Y plane) of a rotor blade tip illustrating the counterbalance of blowing jets and blade-tip vortex flow.

According to this invention a rotor-blade-tip system (see FIGS. 2 and 2A) is provided with at least one vortex jet tube 21 (in the X-direction) for blowing a jet of fluid through an orifice 22. The vortex jet tube 21 is attached to blade 11 but, generally, the term "blade" does not include vortex jet tube for blowing a fluid jet. Fluid from a fluid source, such as a compressor or a compressed air reservior 170 (see FIG. 7) enters a conduit 23 and ejects from an orifice opening 22 in a downward Y-direction (see FIG. 3). As the rotor revolves a vortex 24 generated at the right-hand side blade tip 15, in a counterclockwise-direction, moves downstream (Z-direction) and passes a plane (X-Y plane) which contains the vortex jet tube 21 and the downward fluid jets 25 ejected therefrom. The spacing and intensity of the blowing jets are so designed as to form a substantially jet sheet acting as a jet knife. In this manner the downward jet flow counterbalances and diffuses the counterclockwise upward flow of the blade-tip vortex. This phenomenum is illustrated in FIG. 3 which is a rear view (X-Y plane) of the rotor-blade-tip system. Thus, the present invention uses the jet flow system to abate the circulating flow created near the blade tip and to alleviate the blade-tip vortices.

Figure 4:
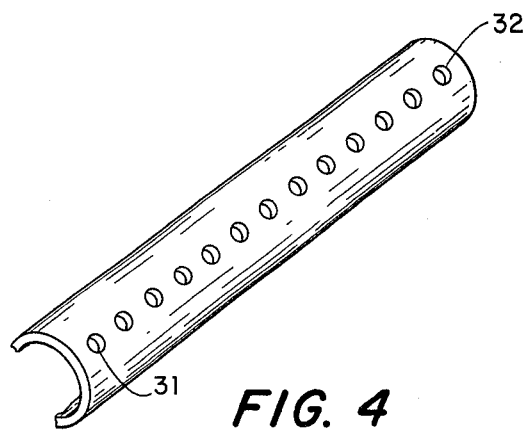
FIG. 4 is a perspective view of a bottom portion of an extended tube having a series of holes for blowing jets.
Figure 5:
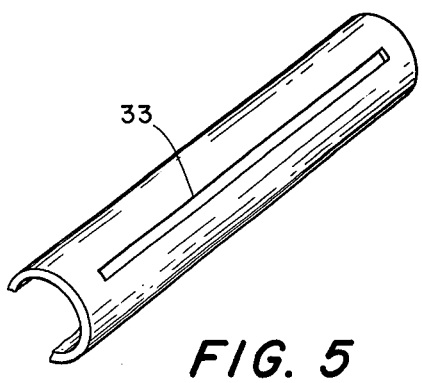
FIG. 5 is a perspective view of a bottom portion of an extended tube having an infinite number of jet openings in the form of a continuous slot.

FIG. 4 discloses a multiplicity of relativey closely spaced jet orifices. Such orifices, if increased to an infinite number, result in a slot 33 as shown in FIG. 5. The width of the slot 33 is made variable according to the variation of orifice size shown in FIG. 4.

Figure 6:
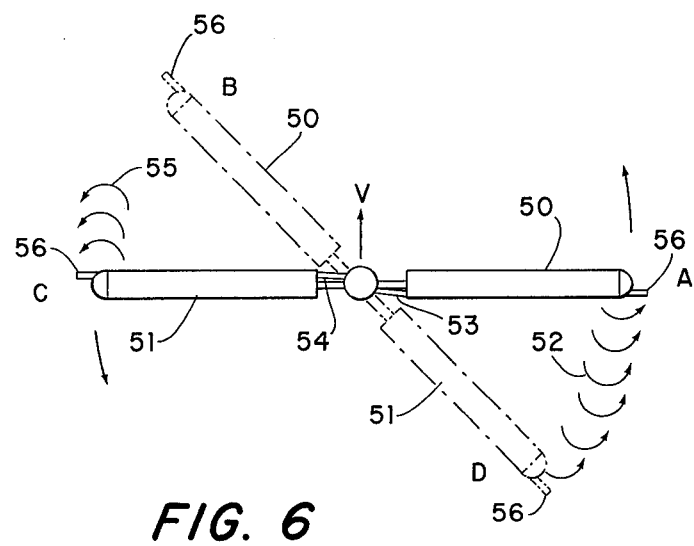
FIG. 6 is a top plan view of a rotor blade system illustrating the blade motion.

Referring to FIG. 6, there is shown a top view of a VTOL rotor with two blades attached. When the VTOL craft is hovering or in vertical ascent, the rotor blades act in a manner similar to that of propeller blades. During its rotation the blade 50 originally at position A moves to a position B, and the blade 51 originally at position C now moves to position D. It can be easily seen that, in the absence of the present invention, the blade 51 at position D encounters the region of vortices 52 which were shed by the blade tip of blade 50. This causes a severe impulsive loading on the following blade 51 which is one of the major sources of VTOL rotor noise (often referred to as blade slap), and rotor vibrations. Similarly, blade 50 at position B is disturbed by the vortices 55 shed by blade 51. Similar or even worse situations occur for a three-or-more bladed rotor.

When the helicopter (or VTOL) is in hovering or vertical ascent flight condition, the alleviation of the blade-tip vortices can be made in a like manner by what has been disclosed above. This is because the blade sustains the same load at any azimuth position. Further, each of the two blades sustains exactly one-half of the gross weight of the craft. For forward flight the lift force on the blade varies as a harmonic function of the azimuth position. This, in turn, produces cyclical blade-tip vortices. In order to counterbalance the cyclical blade-tip vortices the air supply to the jet orifice of the extended tube 56 can be regulated cyclically (see FIGS. 7 and 8) for cyclically altering the jet mass flow during the rotation. This gives the desired amount of air flow to the respective jet orifices through pipes 53 and 54 in the blades 50 and 51, respectively, at any given azimuth position.

Figure 8:
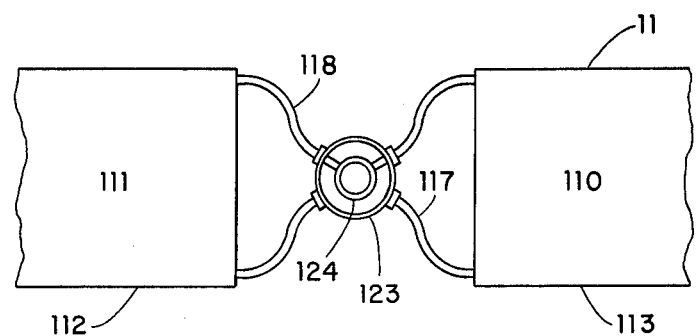
FIG. 8 is a partial top plan view of the illustration in the direction of line 8—8 of FIG. 7.
Figure 7:
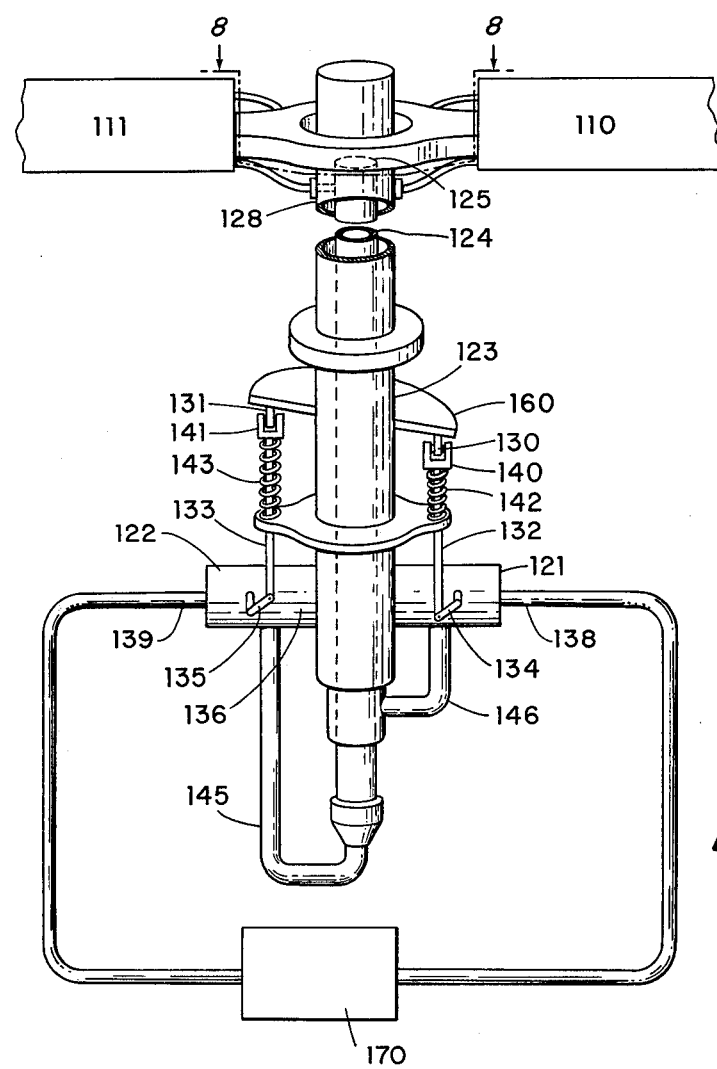
FIG. 7 is a semi-diagrammatic illustration of an air distribution system for supplying such air into the blade ducts to thereby selectively discharge air during their respective advancing and retreating circles.

With reference to FIG. 7 and FIG. 8 (partial top view of FIG. 7), there are shown supply conduits 117 and 118 from a suitable air supply source 170 to suitable follower and valve assembles 121 and 122. Assembles 121 and 122 are controlled by a swash plate 160 on a hollow rotor post 123, which is rotatable with the rotor of the helicopter. Longitudinally and concentrically spaced in the hollow post 123 is an air feed tube 124 which terminates in a separator-bulkhead or manifold 125 inside the post 123. From this conduit 124 flexible conduit 117 is connected. For example, flexible conduit 117 can connect with the extended tube 21 (FIG. 3) to jet means 25 in the trailing edge of blade 11, while flexible conduit 118 from separator-bulkhead of the hollow post 123 above the end portions of tube 124 connects with jet means of the other blade. Thus, as the rotor revolves, the swash plate 160 activates the follower and valve assembles for automatic circulation of jet air currents with respect to the rotor blades during the advancing and retreating cycles thereof. For example, the swash plate 160 is in contact with roller means 130 connected by link members 134 and 135, respectively, to each of one of a pair of valves, not shown, in a valve chamber 136 connected to fluid supply conduits 138 and 139. Also, as shown, each roller is shock mounted in a bracket 140 and 141 by spring means 142 and 143, respectively.

The respective jet conduits in the blades of the present embodiments are supplied with air or gas from a suitable main source 176 in the craft by supply hoses 145 and 146, which connect to the valve chamber 136 adjacent each valve therein.

The swash plate 160 may be controlled by the pilot to regulate the valve means and the quantity of air or gas flow to the jet orifices of the extended tube. This adjustment may be accomplished in the same manner as illustrated in FIG. 1 of prior U.S. Pat. No. 2,925,129.

Figure 9:
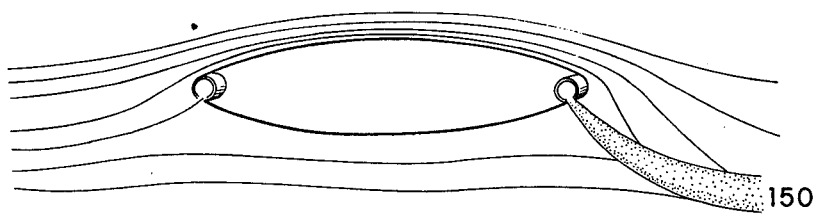
FIG. 9 is a cross-section view of the rotor blade of FIG. 8 to illustrate round leading and trailing edges, including jet means in the form of slotted ducts shown diametrically discharging air into the free stream of the advancing blade.

The novel features of an airfoil of the blade which is oval in cross section with a round leading edge and round trailing edge combined with the novel effects of a jet stream placed along the trailing edge is shown in FIG. 9.

The disclosure in the present application has suggested the use of rotor blade having a cross-section shape which resembles an elongated oval with a blowing jet 150 of fluid capable of being adjustably dispaced with respect to the blade so as to attain the desired high lift. In this device, see FIG. 9, jet 150 is formed at the plurality opening or slot extended to a major portion along the blade span such that the air stream can flow upon the upper side of the blade around its round trailing edge, instead of sharp trailing edge in the conventional blades, and smoothly off the round trailing edge with the jet stream where the circulation is created. This device is usually referred to as jet-circulation-control rotor blade. Hence, a considerable increase in lift can be accomplished without the necessity of the change of the blade pitch angle. The supply of air to the above mentioned jets 150 and the cyclical control of the jets 25 may be accomplished in the same manner as illustrated in FIGS. 7 and 8. Thus, the present invention uses the principle of jet circulation control in cooperation with blade-tip vortex control to substantially improve the overall performance of helicopters.

While only several specific embodiments are herein before illustrated and described, it is to be expressively understood that this invention is not intended to be limited to the exact formations, construction or arrangement of parts as illustrated and described because various modifications may be developed in putting the invention to practice within the scope of the appended claims.

I claim:

1. Apparatus for abating jet-circulation-control helicopter rotor-blade tip vortices formed at the tip of a blade when it is in fluid stream flowing relative to said blade, said vortex being formed as a result of a difference in fluid pressure on one side of the blade relative to the fluid pressure on the opposite side of the blade which causes a rush flow of fluid from the side of higher pressure to the side of lower pressure, said apparatus comprising a jet-circulation-control rotor blade system having at least a pair of blade tips, a source of pressurized fluid, a plurality of jetting means, and means connecting said jetting means to said source of pressurized fluid, each of said plurality of jetting means being located outwardly of a respective one of the said tips for emitting pressurized fluid from said jetting means in the direction toward said side of higher pressure and in a plane substantially perpendicular to the direction of flow of said fluid stream.

2. The structure according to claim 1 wherein said jetting means comprising a hollow post means for supplying fluid under pressure through the post, hollow blade means having an inner post adjacent portion and a tip mounted for rotating on said post, a fluid conveying conduit extending from the post to said blade means at a root portion thereof, said conduit mounted in the blade means and extending spanwise thereof, vortex jet tubes having jet nozzles therein opening into the air stream below said vortex jet tubes to greatly reduced blade tip vortices, and means connecting the conduit to the vortex jet tubes.

3. The structure according to claim 2 together with means for cyclically controlling the pressurized fluid to said jet vortex tubes with respect to the periodic movement of the said blades.

4. The structure according to claim 2 together with means for cyclically controlling the pressurized fluid to said jet tubes in the blade for jet stream producing means along one edge of the said blades with respect to periodic movement of the rotor blades.

5. Apparatus as defined in claim 1 wherein said blade tips include a round leading edge and a round trailing edge, and jet stream producing means in at least one of the edges for controlling the circulation and further increasing the lift.

* * * * *